United States Patent
Lu

(10) Patent No.: US 9,247,819 B2
(45) Date of Patent: Feb. 2, 2016

(54) TUBE FIXING DEVICE

(71) Applicant: Chien-Ming Lu, Taichung (TW)

(72) Inventor: Chien-Ming Lu, Taichung (TW)

( * ) Notice: Subject to any disclaimer, the term of this patent is extended or adjusted under 35 U.S.C. 154(b) by 181 days.

(21) Appl. No.: 14/027,192

(22) Filed: Sep. 14, 2013

(65) Prior Publication Data

US 2015/0076292 A1  Mar. 19, 2015

(51) Int. Cl.
*F16L 3/08* (2006.01)
*A47C 5/10* (2006.01)
*A47C 7/00* (2006.01)
*F16C 11/10* (2006.01)

(52) U.S. Cl.
CPC . *A47C 5/10* (2013.01); *A47C 7/002* (2013.01); *F16C 11/10* (2013.01)

(58) Field of Classification Search
CPC ......... A47C 5/10; A47C 7/002; F16L 3/1215; F16L 7/00; Y10T 403/599; Y10T 403/59; Y10T 403/60; Y10T 403/32426; Y10T 74/2078; Y10T 74/20816; Y10T 74/32418; Y10T 74/20792; Y10T 74/2081; F16B 21/18; F16B 21/186; F16C 11/10
See application file for complete search history.

(56) References Cited

U.S. PATENT DOCUMENTS

| | | | | |
|---|---|---|---|---|
| 5,188,139 A | * | 2/1993 | Garelick | 135/67 |
| 5,329,954 A | * | 7/1994 | Miyoshi | 135/71 |
| 5,456,135 A | * | 10/1995 | Li | 74/551.7 |
| 6,290,192 B1 | * | 9/2001 | Messerli | 248/188.5 |
| 2007/0239064 A1 | * | 10/2007 | Cicenas et al. | 600/566 |
| 2011/0114420 A1 | * | 5/2011 | Henthorn | 187/219 |
| 2011/0166606 A1 | * | 7/2011 | Stihl et al. | 606/279 |

* cited by examiner

*Primary Examiner* — Brian Mattei
(74) *Attorney, Agent, or Firm* — patenttm.us

(57) ABSTRACT

A tube fixing device has an outer tube, an inner tube, two fixing pins, and a fixing stick. The outer tube has an aligning hole formed through the outer tube. The inner tube is rotatably inserted into the outer tube and has two tapered fixing recesses formed in the inner tube and selectively aligned with the aligning hole. The fixing pins are combined with the inner tube and abut the outer tube at different locations according to the rotation of the inner tube relative to the outer tube. The fixing stick is retractably combined with the outer tube and has a stick tube and a tapered insertion stick inserted in one of the fixing recesses. The insertion end, the fixing pins and the inner tube selectively form a three-point contact status.

8 Claims, 9 Drawing Sheets ns 30, and a fixing stick 40.
TUBE FIXING DEVICE

BACKGROUND OF THE INVENTION

1. Field of the Invention

The present invention relates to a fixing device, and more particularly to a tube fixing device.

2. Description of Related Art

A conventional tube fixing device is applied on a folding chair, the household furniture, sports products, or other tube structures to provide a variety of operational statuses.

A folding chair has a chair seat and two chair legs. The chair legs are foldably mounted on a bottom of the chair seat. When the chair legs are unfolded relative to the chair seat, the folding chair is formed as a U-shape.

The tube fixing device is mounted on the bottom of the chair seat and one of the chair legs to selectively fix the position of the corresponding chair leg relative to the chair seat. The tube fixing device has a tube fixing stick and a fixing recess. The tube fixing stick is T-shaped. The fixing recess is formed in the chair seat and the chair leg. The folding chair has two operational statuses. When the chair legs are unfolded relative to the chair seat, the tube fixing stick is inserted in and fixed in the fixing recess. When the chair legs are folded relative to the chair seat, the tube fixing stick is pulled out from the fixing recess, such that the chair legs can be pivoted relative to the chair seat.

However, the tube fixing device lacks an additional fixing unit to fix the tube fixing stick relative to the fixing recess, such that the tube fixing stick is detached from the fixing recess easily. The contact area between the tube fixing stick and the fixing recess is insufficient since an end of the tube fixing stick inserted in the fixing recess and the fixing recess are both round in cross sections. Thus, the end of the tube fixing stick inserted in the fixing recess cannot tightly abut an inner surface defined around the fixing recess. Accordingly, the chair legs may shake relative to the chair seat when in use.

SUMMARY OF THE INVENTION

The main objective of the present invention is to provide a tube fixing device to resolve the aforementioned problems.

The tube fixing device has an outer tube, an inner tube, two fixing pins, and a fixing stick.

The outer tube is hollow and has an aligning hole formed through the outer tube.

The inner tube is rotatably inserted into the outer tube and has two fixing recesses, wherein the fixing recesses are tapered, are formed in the inner tube, are arranged along a periphery of the inner tube, and are selectively aligned with the aligning hole.

The fixing pins are combined with the inner tube and abut the outer tube at different positions according to the rotation of the inner tube relative to the outer tube.

The fixing stick is retractably combined with the outer tube and has a stick tube and an insertion stick. The stick tube is combined with the outer tube. The insertion stick is inserted in the stick tube, is selectively engaged with the stick tube, is selectively inserted in and abuts one of the fixing recesses, and has an insertion end. The insertion end is tapered and is inserted in the fixing recess in which the insertion stick is inserted. The insertion end, the fixing pins and the inner tube selectively form a three-point contact status.

Other objectives, advantages and novel features of the present invention will become more apparent from the following detailed description when taken in conjunction with the accompanying drawings.

DETAILED DESCRIPTION OF PREFERRED EMBODIMENT

A tube fixing device in accordance with the present invention is applied on two tubes that can be pivoted relative to each other to provide at least two operational states of the tubes. The following description of the tube fixing device is based on the operational status that the tubes are mounted on a folding chair.

Figure 1:
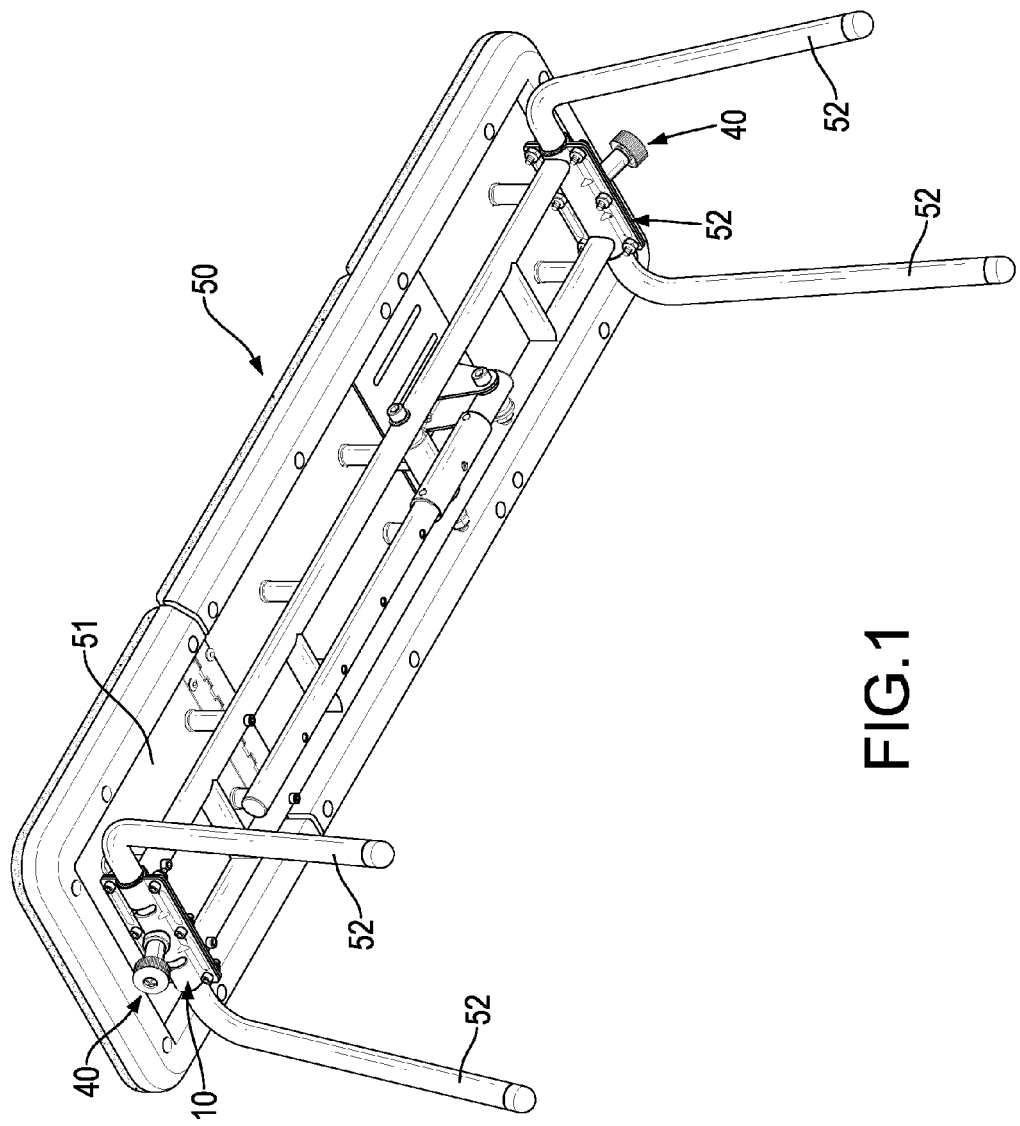
FIG. 1 is a perspective view of a preferred embodiment of a tube fixing device in accordance with the present invention.
Figure 2:
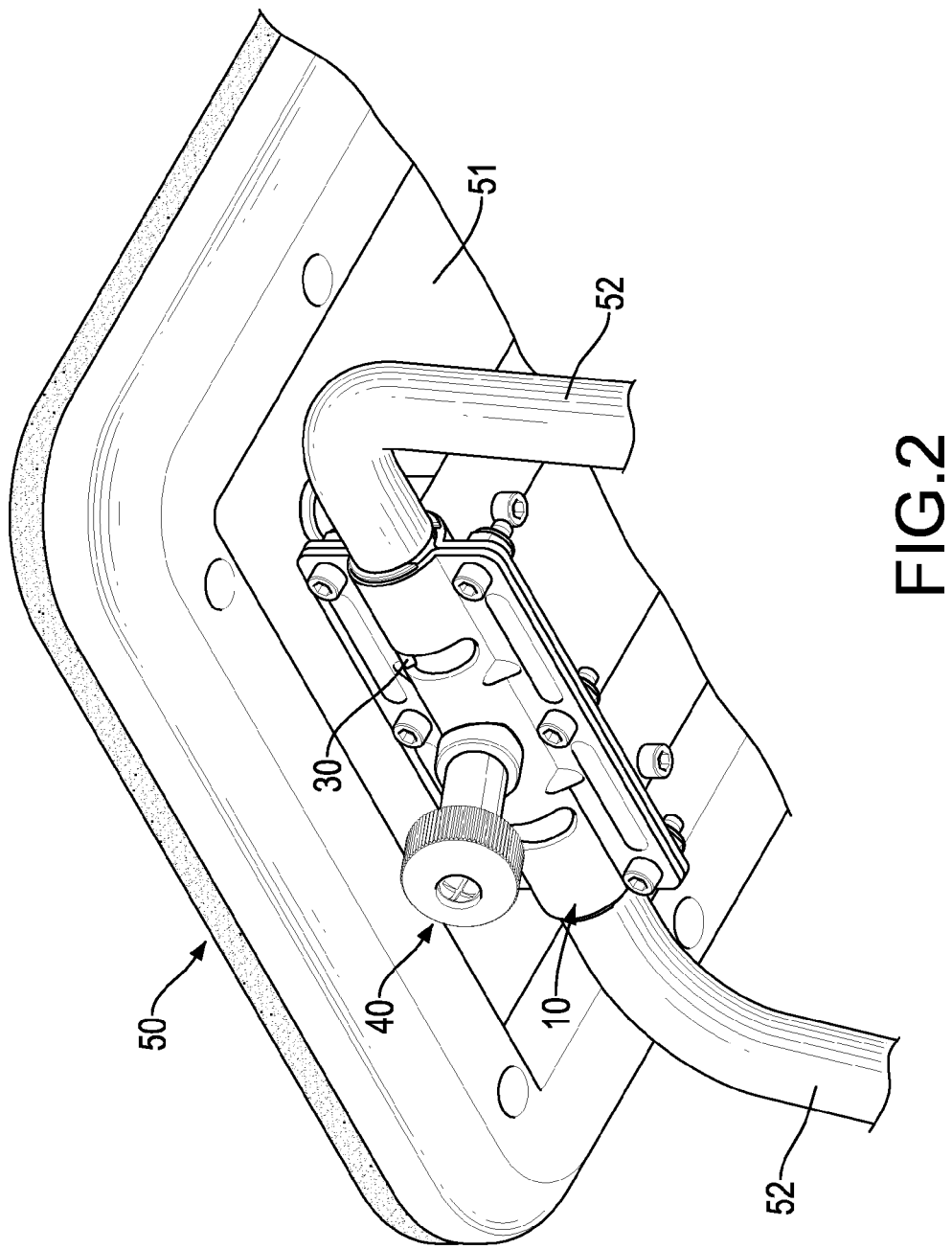
FIG. 2 is an enlarged perspective view of the tube fixing device in FIG. 1.
Figure 3:
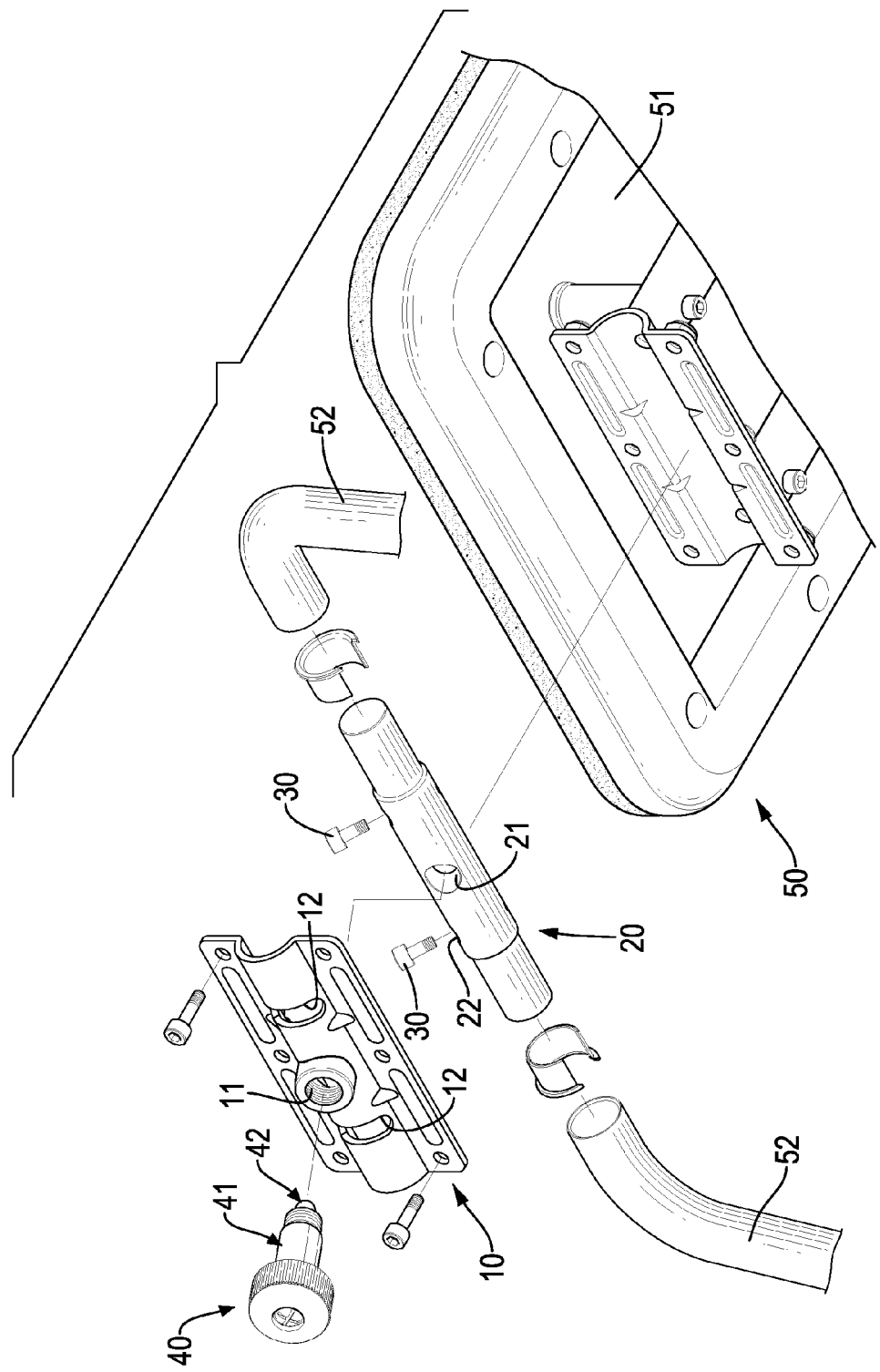
FIG. 3 is an enlarged exploded perspective view of the tube fixing device in FIG. 1.
Figure 4:
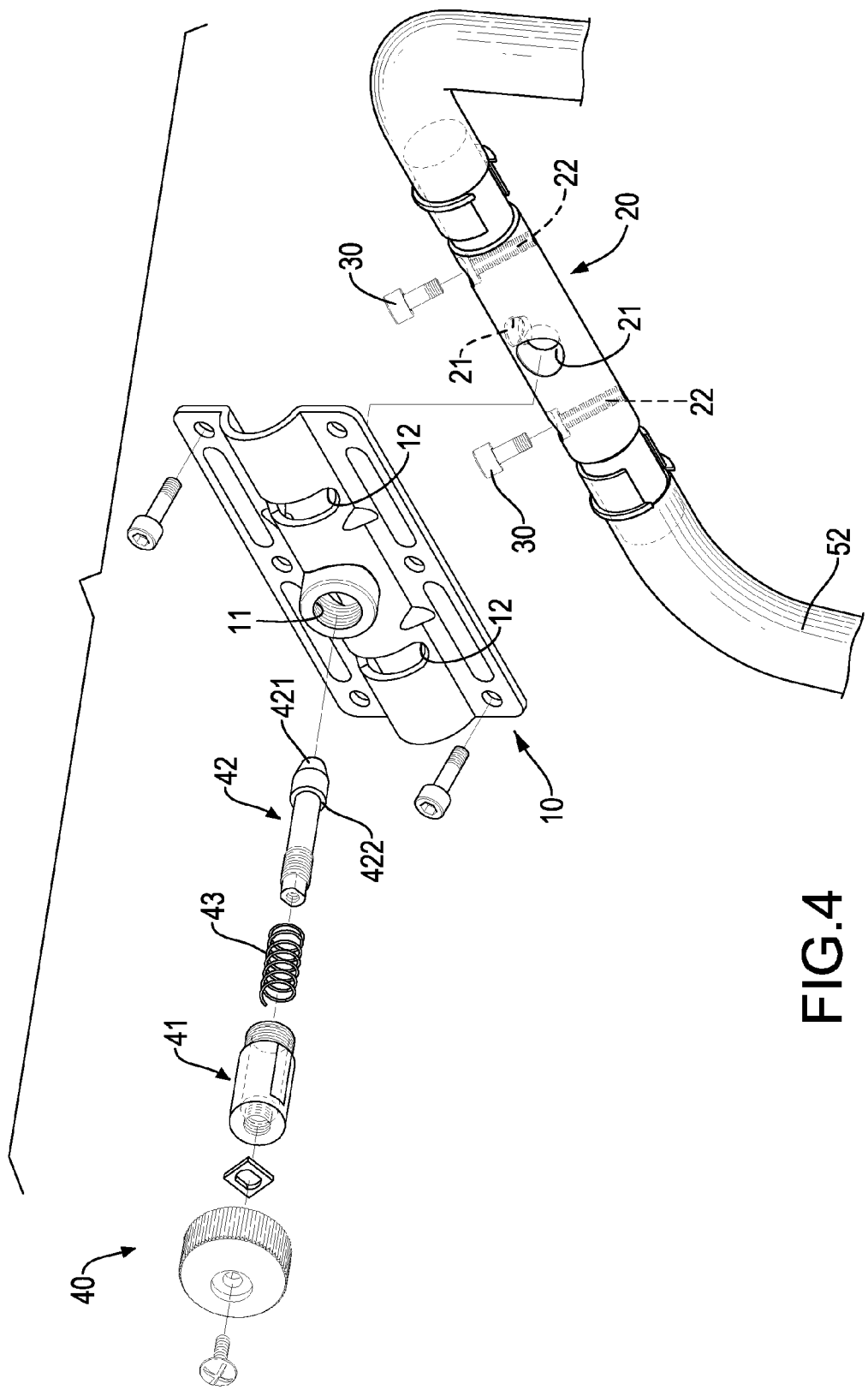
FIG. 4 is an enlarged exploded perspective view of the tube fixing device in FIG. 1.

With reference to FIGS. 1 to 3, a first preferred embodiment of a tube fixing device in accordance with the present invention has an outer tube 10, an inner tube 20, two fixing pins 30, and a fixing stick 40.

With reference to FIGS. 2 to 5, the outer tube 10 is hollow, is fixed on a bottom of a chair seat 51 of a folding chair 50, and has an aligning hole 11 and two sliding slits 12. The aligning hole 11 is formed through the outer tube 10 and communicates with an inner space of the outer tube 10. The sliding slits 12 are elongated, are formed through the outer tube 10 along a periphery of the outer tube 10 and communicate with the inner space of the outer tube 10. The sliding slits 12 are respectively located at two sides of the aligning hole 11 and are parallel with each other The inner tube 20 is connected between two chair legs 52 of the folding chair 50, is rotatably inserted into the outer tube 10, and has two fixing recesses 21 and two screw holes 22. The fixing recesses 21 are tapered, are formed in the inner tube 20, and are arranged along a periphery of the inner tube 20. The fixing recesses 21 have different depths from each other and are selectively aligned with the aligning hole 11. The screw holes 22 are formed radially through the inner tube 20 and are respectively aligned with the sliding slits 12.

The fixing pins 30 are respectively combined with the inner tube 20 via the screw holes 22 and respectively slide in the sliding slits 12, such that the fixing pins 30 can abut the outer tube 10 at different positions when the inner tube 20 is rotated relative to the outer tube 10.

The fixing stick 40 is retractably combined with the outer tube 10 and has a stick tube 41, an insertion stick 42, and a spring 43. The stick tube 41 is combined with the outer tube 10 by threads. The insertion stick 42 is inserted in the stick tube 41, is selectively engaged with the stick tube 41 and is selectively inserted in and abuts an inner surface defined around one of the fixing recesses 21. Perfectly, the insertion stick 42 is selectively combined and engaged with the stick tube 41 by threads. The insertion stick 42 has an insertion end 421 and an abutting portion 422. The insertion end 421 of the insertion stick 42 is tapered, and is inserted in the fixing recess 21 in which the insertion stick 42 is inserted. A side of the insertion end 421 of the insertion stick 42 abuts and selectively slides along a side of the inner surface defined around the fixing recess 21. The abutting portion 422 annularly protrudes from a periphery of the insertion stick 42 to form a step structure and is adjacent to the insertion end 421. The spring 43 is mounted around the insertion stick 42 and abuts between the abutting portion 422 and the stick tube 41.

With reference to FIGS. 5 to 9, in use, the fixing stick 40 is retractable relative to the outer tube 10 and is selectively engaged with one of the fixing recesses 21 depending on different use requirements, such that the tube fixing device can provide two operational states of the folding chair 50 for the user.

Figure 5:
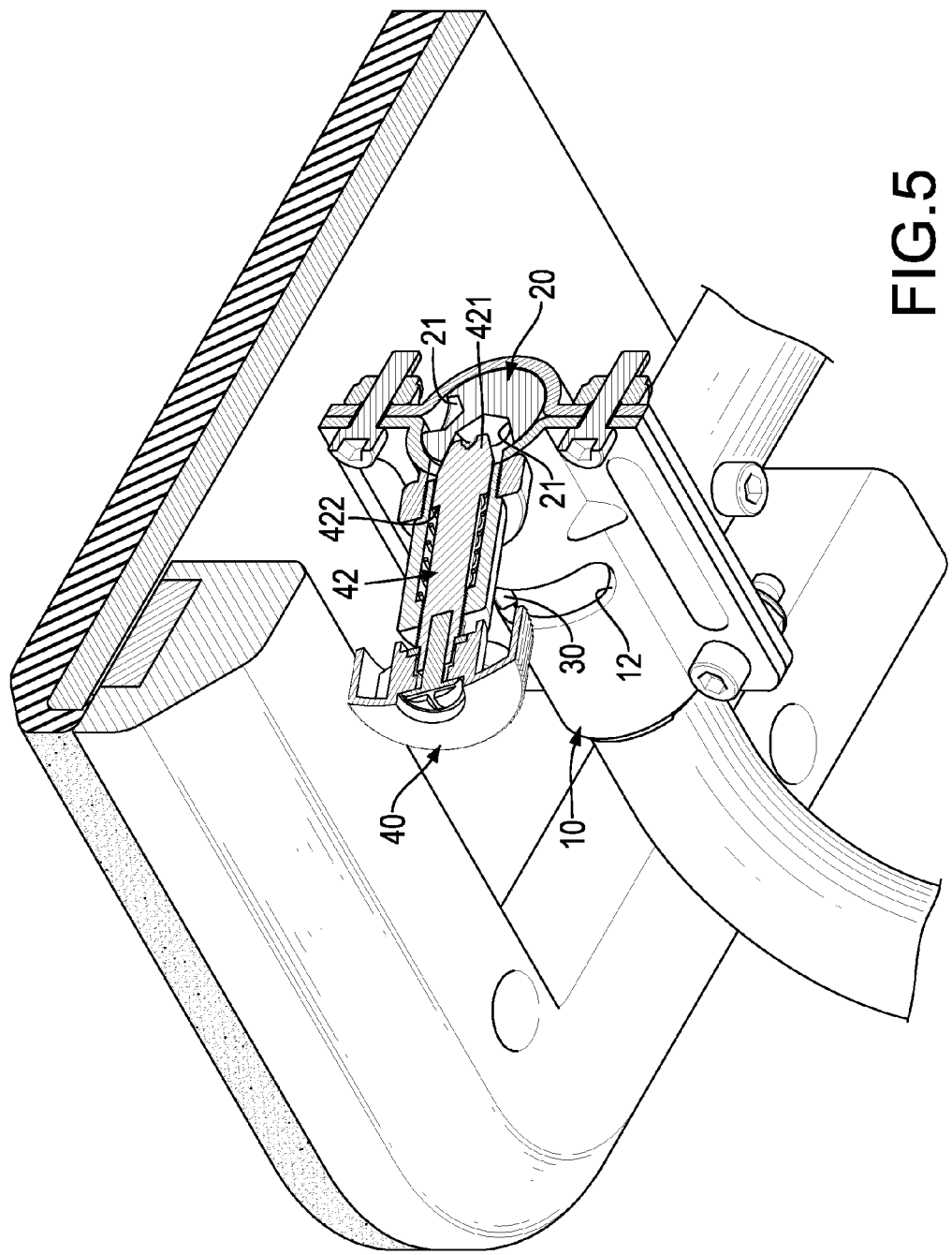
FIG. 5 is a cross sectional perspective view of the tube fixing device in FIG. 1.
Figure 6:
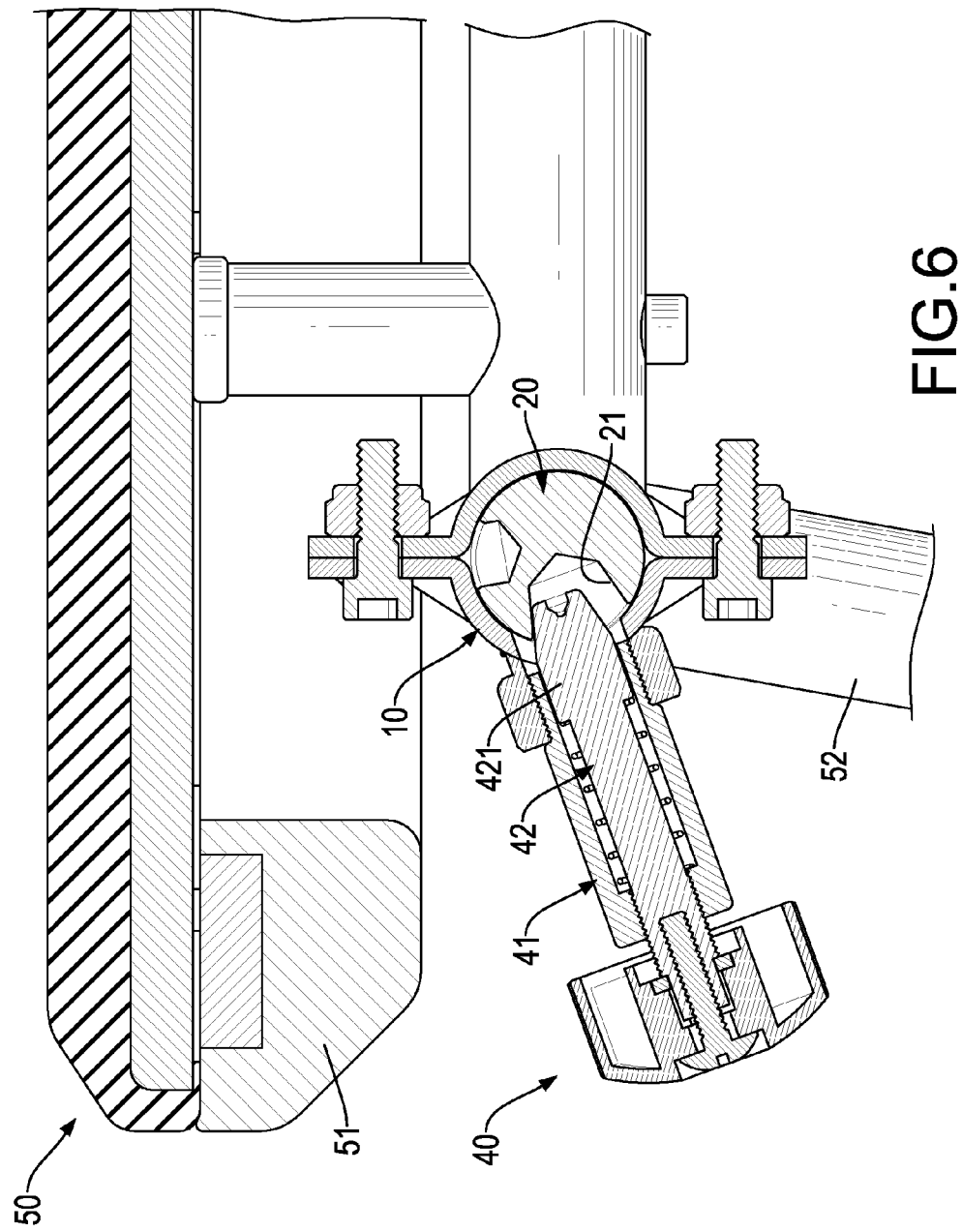
FIG. 6 is an operational cross sectional side view of the tube fixing device in FIG. 1.

With reference to FIGS. 5 and 6, when the chair legs 52 are unfolded relative to the folding chair 50, the insertion end 421 is inserted in and abuts the inner surface defined around one of the fixing recesses 21 that has a deeper depth than the other one. The insertion stick 42 is combined with the stick tube 41 by threads. The fixing pins 30 respectively abut two end portions of the sliding slits 12. The inner tube 20 is engaged by three contact points (the insertion end 421 of the insertion stick 42 and the two fixing pins 30) and cannot be rotated relative to the outer tube 10. Therefore, the chair legs 52 cannot be rotated relative to the folding chair 50 since the chair legs 52 are connected with the inner tube 20. Moreover, an abutting area between the insertion end 421 and the inner surface defined around the fixing recess 21 is larger than that of the conventional tube fixing device since the insertion end 421 and the fixing recess 21 are tapered. The insertion end 421 tightly abuts the inner surface defined around the fixing recess 21 since the insertion stick 42 is engaged with the stick tube 41 to keep the chair legs 52 from shaking when in use.

Figure 7:
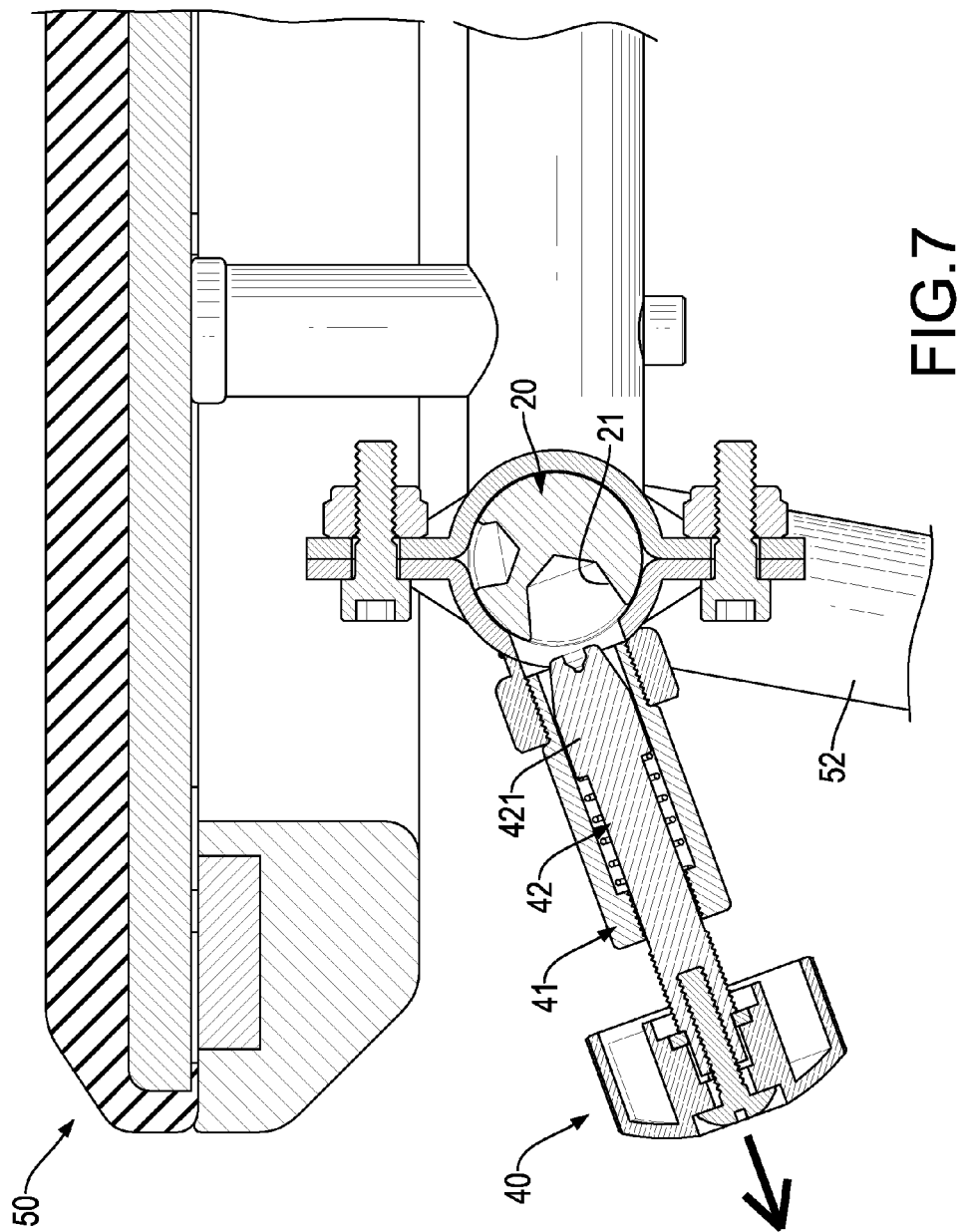
FIG. 7 is an operational cross sectional side view of the tube fixing device in FIG. 1.
Figure 8:
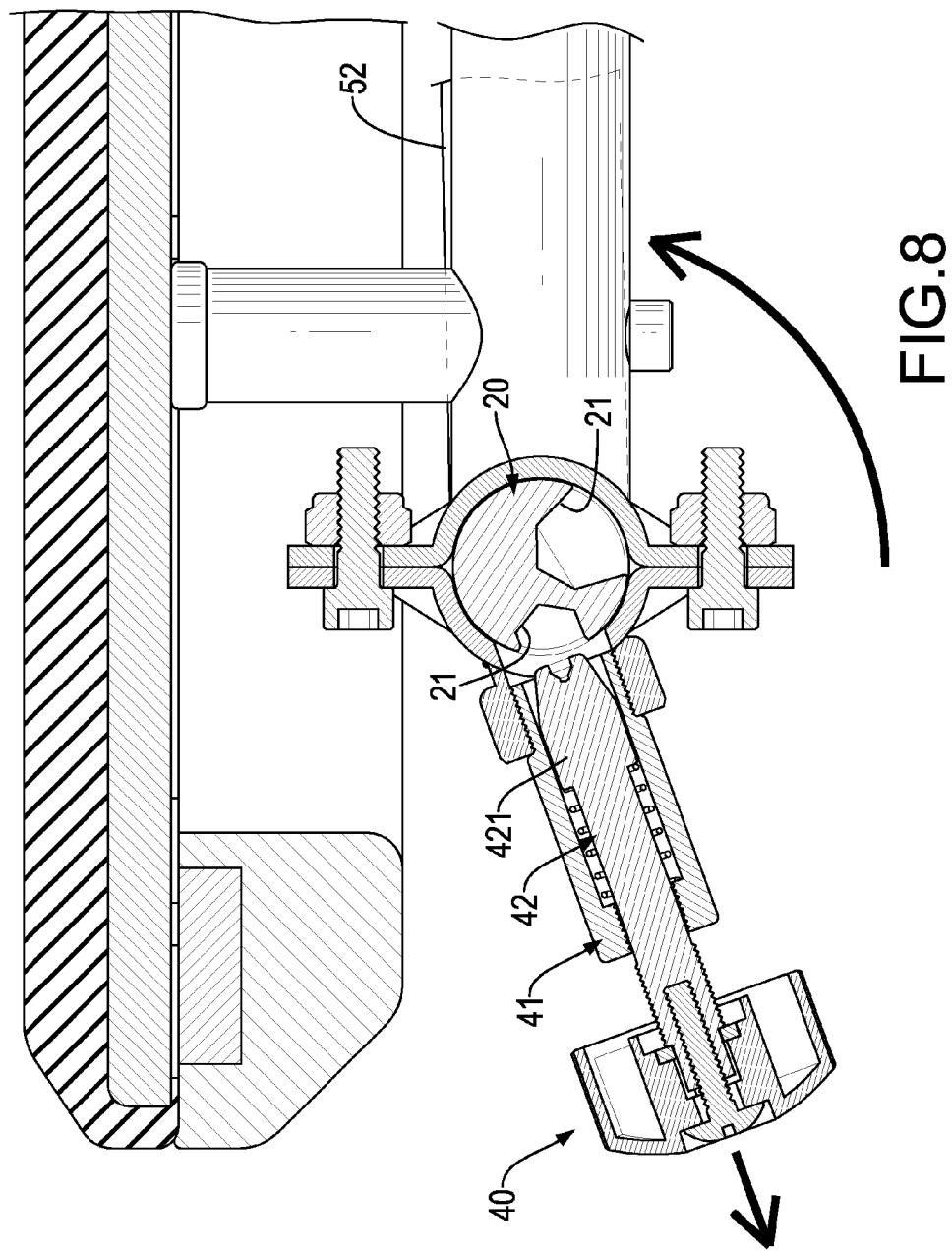
FIG. 8 is an operational cross sectional side view of the tube fixing device in FIG. 1.
Figure 9:
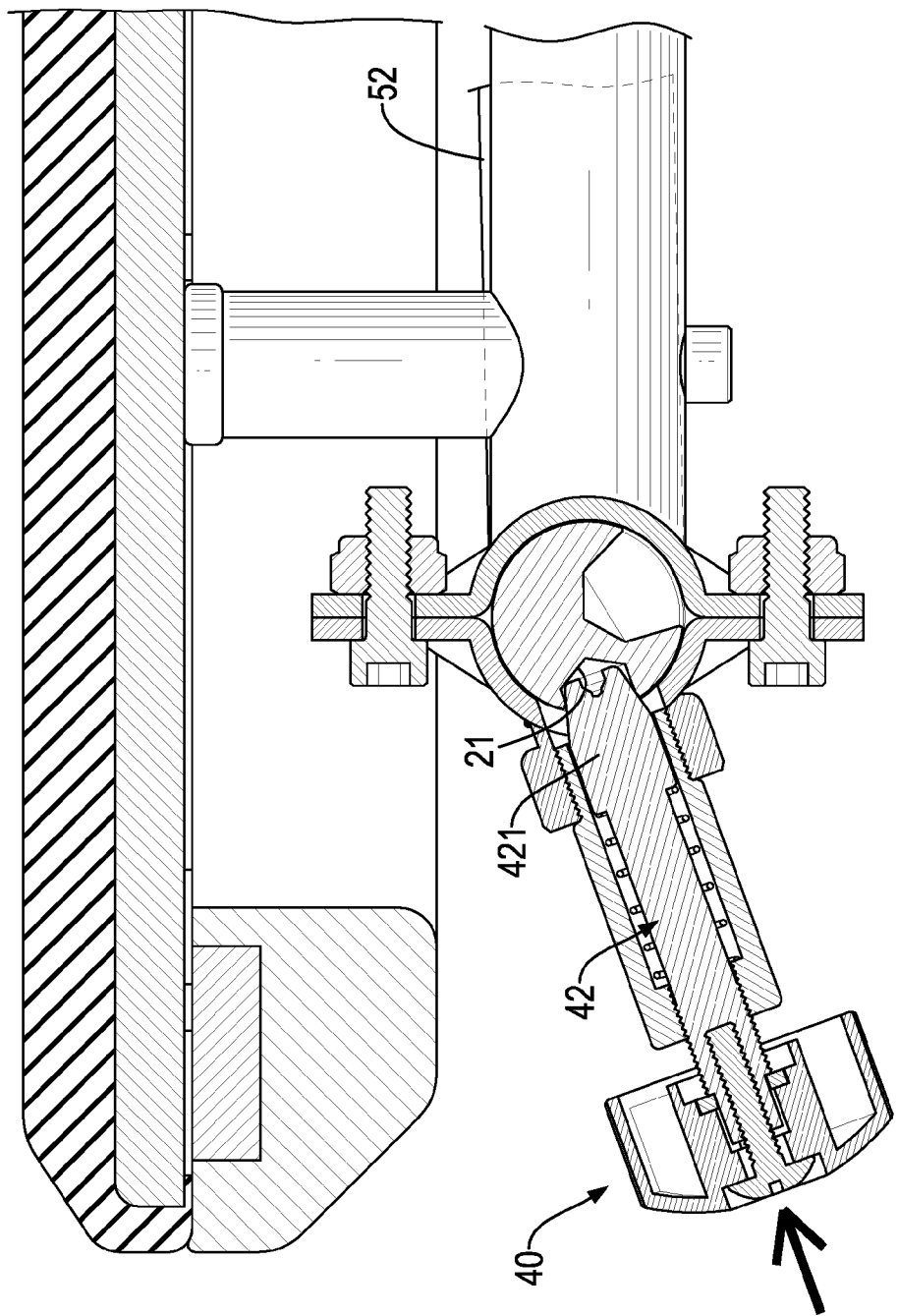
FIG. 9 is an operational cross sectional side view of the tube fixing device in FIG. 1.

With reference to FIGS. 7 to 9, when the user wants to fold the chair legs 52 relative to the folding chair 50, the insertion stick 42 is first loosened from the stick tube 41, that is, the insertion stick 42 is rotated relative to the stick tube 41 to release the screw-locking between the insertion stick 42 and the stick tube 41. Then, the insertion stick 42 is pulled away from the stick tube 41, such that the insertion end 421 is detached from the fixing recess 21 that is engaged. After the above procedures, the inner tube 20 can be rotated relative to the outer tube 10, and the chair legs 52 can be folded relative to the folding chair 50. After the chair legs 52 are folded relative to the folding chair 50, one of the fixing recesses 21 that has a shallower depth than the other fixing recess 21 is rotated and aligned with the insertion end 421. Then, the insertion stick 42 is pushed toward the corresponding fixing recess 21 and is combined with the stick tube 41 by threads again. Finally, the insertion end 421 is engaged with the corresponding fixing recess 21, such that the inner tube 20 is kept from being rotated relative to the outer tube 10.

When the user is sitting on the chair seat of the folding chair 50, the chair legs 52 are unfolded relative to the folding chair 50. Therefore, the insertion end 421 is inserted in the fixing recess 21 that has the deeper depth to provide a firm supporting effect to the folding chair 50. Alternatively, when the folding chair 50 is not in use, the chair legs 52 are folded relative to the folding chair 50. Therefore, the insertion end 421 is inserted in the fixing recess 21 that has the shallower depth since the inner tube 20 just needs a little supporting force.

From the above description, it is noted that the present invention has the following advantages:

1. The inner tube 20 is engaged with the outer tube 10 and is kept from being rotated relative to the outer tube 10 due to the three-point contact status, including that:

(a) the fixing pins 30 combined with the inner tube 20 abut the outer tube 10 at the sliding slits 12 of the outer tube 10; and (b) the fixing stick 40 inserted in the aligning hole 11 of the outer tube 10 and engaged with the outer tube 10 abuts the corresponding fixing recess 21.

Moreover, the contact area between the insertion end 421 and the fixing recess 21 is larger than that of the conventional tube fixing device because the insertion end 421 and the fixing recess 21 are tapered. The insertion end 421 tightly abuts the fixing recess 21 because the fixing stick 40 is engaged with the outer tube 10. Accordingly, the chair legs 52 can be firmly operated when in use.

2. The insertion stick 42 is selectively engaged with the stick tube 41 by threads, such that the insertion stick 42 can be kept from detaching from the fixing recess 21 while in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tube fixing device having:
   an outer tube being hollow and having an aligning hole formed through the outer tube;
   an inner tube rotatably inserted into the outer tube and having two fixing recesses, wherein the fixing recesses are tapered, are formed in the inner tube, are arranged along a periphery of the inner tube, and are selectively aligned with the aligning hole;
   two fixing pins combined with the inner tube and abutting the outer tube at different positions according to a rotation of the inner tube relative to the outer tube; and
   a fixing stick retractably combined with the outer tube and having
      a stick tube combined with the outer tube; and
      an insertion stick inserted in the stick tube, selectively engaged with the stick tube by threads, selectively inserted in and abutting an inner surface defined around one of the fixing recesses and having an insertion end, wherein
         the insertion end is tapered, and is inserted in the fixing recess in which the insertion stick is inserted;
         a side of the insertion end of the insertion stick abuts and selectively slides along a side of the inner surface defined around the fixing recess; and
         the insertion end, the fixing pins and the inner tube selectively form a three-point contact status.

2. The tube fixing device as claimed in claim 1, wherein the outer tube further has two sliding slits being elongated, formed through the outer tube along a periphery of the outer tube and respectively accommodating and abutting the fixing pins.

3. The tube fixing device as claimed in claim 2, wherein the inner tube further has two screw holes formed radially through the inner tube and respectively aligned with the sliding slits, and the inner tube is combined with the fixing pins respectively via the screw holes.

4. The tube fixing device as claimed in claim 3, wherein
the insertion stick further has an abutting portion protruding from a periphery of the insertion stick to form a step structure and being adjacent to the insertion end; and
the fixing stick further has a spring mounted around the insertion stick and abutting between the abutting portion and the stick tube.

5. The tube fixing device as claimed in claim 4, wherein the fixing recesses have different depths from each other.

6. The tube fixing device as claimed in claim 3, wherein the fixing recesses have different depths from each other.

7. The tube fixing device as claimed in claim 2, wherein the fixing recesses have different depths from each other.

8. The tube fixing device as claimed in claim 1, wherein the fixing recesses have different depths from each other.

\* \* \* \* \*